United States Patent [19]
Ferguson et al.

[11] Patent Number: 4,808,633
[45] Date of Patent: Feb. 28, 1989

[54] VESICULATED POLYMER GRANULES

[75] Inventors: Loreen D. Ferguson, Mississauga; Peter C. Hayes; Tadas S. Macas, both of Toronto, all of Canada

[73] Assignee: C-I-L Inc., North York, Canada

[21] Appl. No.: 95,419

[22] Filed: Sep. 8, 1987

[51] Int. Cl.$^4$ ............................................. C08L 67/06
[52] U.S. Cl. ..................................... 521/63; 521/64; 523/502; 525/46
[58] Field of Search ............... 521/63, 64; 523/502; 525/46

[56] References Cited
U.S. PATENT DOCUMENTS 3,822,224  7/1974  Gillan .................................... 521/63
4,278,575  7/1981  Nakamura ............................ 525/46

*Primary Examiner*—Patricia Short
*Attorney, Agent, or Firm*—C. Brian Barlow

[57] ABSTRACT

Vesiculated granules of cross-linked carboxylated polyester resin prepared by the free radical polymerization of a dispersion of an ethylenically unsaturated monomer, a carboxylated unsaturated polyester resin having an acid value of from 5–50 mg KOH/g and an alkyl acryloyl derivative. Aqueous compositions comprising the granules are used in conjunction with fibrous cellulosic or non-cellulosic materials for the preparation of paper containing the vesiculated polymeric granules dispersed therein. The paper has improved optical opacity.

5 Claims, No Drawings

VESICULATED POLYMER GRANULES

This invention relates to vesiculated polymer granules, aqueous compositions comprising said granules and to said compositions comprising said granules and fibrous material of use in papermaking.

Paper is typically made from aqueous suspensions of fibrous cellulosic or non-cellulosic material which may have been delignified and/or bleached, e.g. plant matter, such as trees, cotton, bagasse, and synthetic polymers, such as rayon. To the aqeous fibrous suspension are generally added sizing materials, wet and dry strength additives, defoamers, biocides, dyes, and particularly, retention aids and fillers. The suspension (furnish) is transferred to a forming wire for water drainage to concentrate solids, and subsequently dried to the desired basis weight.

The development of fibrous systems having a high opacity has always been a concern to paper manufacturers. The degree of opocity of a particular substrate is the result of diffuse light-scattering which occurs when visible radiation is reflected from particles on the surface of the substrate and in the substrate medium itself. It has been customary tto use high density inorganic mineral fillers, such as calcium carbonate and certain clays, to enhance the opacity of paper sheets. Unfortunately, the use of such fillers has several disadvantages in the manufacture of paper. Most inorganic mineral fillers possess a low opacity-to-weight ratio when included in paper. In addition, the generally low retention of the inorganic mineral opacifiers in the paper results in a financial loss by virtue of the by-product waste produced from the wire during sheet formation. More importantly, this poor filler retention may result in contamination of streams, lakes and other waterways.

It is customary to incorporate in the dilute paper furnish, just before formation on the wire, small amounts of polyelectrolyte retention aids to give improved retention of the fibrous material, fillers and fines on the wire during sheet formation. This reduces, somewhat, the loss of the filler to the by-product waste.

It has been suggested that microencapsulatted polymers can be incorporated in a paper sheet to enhance opacity. The substantially spherical polymers can be added in the dilute paper furnish before formation on the wire as substitutes for inorganic mineral fillers. These microcapsular opacifiers can also be incorporated in coatings for fibrous or non-fibrous substrates. For example, Canadian Patent No. 856,861 describes polymer granules with a vesiculated structure that can be utilized in a coating composition and polymer films to inpart an opacity which is greater than non-vesicuated granules of the same composition.

It is an object of the present invention to provide a means for increasing the retention of pigmented and/or non-pigmented vesiculated granules in a paper sheet.

It is further object of the present invention to provide a reduction in the amount of opacifier which is lost during the formation of paper on the forming wire.

Accordingly, the invention provides vesiculated granules of cross-linked carboxylated polyester resin of the type prepared by the free radical polymerization of a dispersion comprising (a) an ethylenically unsaturated monomer; (b) a carboxylated unsaturated polyester resin having an acid value of from 5–50 mg KOH/g; (c) water; and (d) a base; characterised in that said dispersion further comprises a polymerizable alkyl acryloyl derivative of the formula:

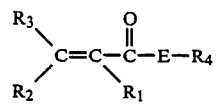

where $R_1$, $R_2$ and $R_3$ are selelcted from H and $CH_3$; E is NH or O; $R_4$ is $C_{1-6}$ alkyl substituted with Z; wherein Z is $NR_5R_6$; wherein $R_5$ is $C_{1-4}$ alkyl and $R_6$ is H; or $R_5$ and $R_6$ are indepepndently $C_{1-3}$ alkyl; and quaternary $C_{1-3}$ alkyl salts thereof.

Preferably, the alkyl acryloyl derivative has the formla:

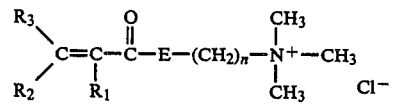

wherein $R_1$, $R_2$, $R_3$ and E are as hereinbefore defined and n is selected from 1–3.

The vesiculated beads provided herein have a highly cross-linked polymeric body preferably constituted by a carboxyl-functional unsaturated polyester resin cross-linked with an ethylenically unsaturated monomer and an alkyl acryloyl derivative copolymerized therewith.

We have found in accordance with the present invention that the chemical incorporation of an alkyl acryloyl derivative electrolyte within a pigmented or non-pigmented vesiculated granule to constitute a polyelectrolyte retention aid provides enhanced retention of said granule, filler and fines within a fibrous cellulosic or non-fibrous cellulosic paper sheet. Surprisingly, it has been found that when these pigmented and/or non-pigmented vesiculated granules are added to an aqueous paper pulp furnish before being formed into a paper sheet on the forming wire, the resulting paper sheet achieves an enhanced opacity.

Thus, in a further feature the invention provides an aqueous composition comprising vesiculated granules according to the invention as hereinbefore defined and a fibrous cellulosic or non-fibrous cellulosic material in the form of a paper pulp.

In a further feature of the invention, the vesicles contain particulate solids. The particulate solids may be dispersed in liquid in which the polymer is insoluble or may be associated with essentially gaseous components alone. For example, the particulate solids used in the granules may be any suitable organic or inorganic filler. Such fillers include those finely divided materials which have been conveniently employed for the purpose of enhancing optical properties, such as opacity, in a paper sheet. Suitable fillers include, for example, $TiO_2$, $CaCO_3$, $Al_2O_3.3H_2O$, barytes ($BaSO_4$), clay $CaSO_4$, $CaSiO_3$, talc, and the like. Preferred inorganic fillers for the purpose of the present invention are $TiO_2$, $CaCO_3$, $Al_2O_3.3H_2O$, $BaSO_4$, and clay, with titanium dioxide being particularly preferred.

Any desired filler particle size may be used, as long as it is suitable for incorporation into the vesicular structure. Thus, for example, titanium dioxide having a mean particle size between 0.1 and 0.35 microns is highly suitable for the purposes of this invention.

The technique of preparing porous granules from carboxylated, unsaturated polyester resin by emulsifying water into the polyester resin in the presence of a base and then polymerizing the resin has been known for some time. The background to the subject is well covered in the literature, for example, in articles by Kershaw (Australian OCCA Proceedings and News, 8 No. 8, 4 (1971)), and Treier (TAPPI, 55 No. 5, (1972)). Numerous patents relating to these granules have also been issued, which include U.S. Pat, Nos. 3,822,224; 3,8879,314; 3,891,577; 3,933,579; 4,089,819; 4,321,332; and particularly, Canadian Pat. No. 1,139,048. Although it is not intended to limit the present invention to any particular process of manufacture or choice of carboxylated, unsaturated polyester resins of which the vesiculated beads are comprised, the process of preparation of vesiculated polyester resin granules as outlined in Canadian Pat. No. 1,139,048 is preferred. However, in the preparation of prior art vesiculated granules it is knwown that a thickening agent is required to stabilize the granules after formation by the "double emulsion" process. In the absence of the thickener, or constatnt agitation, the granules will settle into a hard-packed layer at the bottom of the container. This tendency to settle or aggregate is undesirable in that "grit" particles may form, and the settled layer is difficult to resuspend. A further disadvantage is the requirementt of additional amine to the system to activate the thickener, which contributes to an undesirable odour.

Surprisingly, we have now found that is possible to prepare dimensionally stable granules by a double emulsion process from which all the suspending thickener and associated amine can be eliminated.

Accordingly, in a further aspect the invention provides an aqueous composition comprising vesiculated granules as hereinbefore defined.

Carboxylated unsaturated polyesters which will cross-link by reaction with ethylenically unsaturated monomers are well known. Suitable polyester resins are the condensation products of dicarboxylic acids (or their corresponding anhydrides) and dihydric alcohols, polymerizable unsaturation being introduced into the chain by the use of a proportion of $\alpha,\beta$-ethylenically unsaturated acid. The polyester resins from which selection is made are condensation products of polybasic acids (or their corresponding anhydrides) and dihydric alcohol. Polymerizable unsaturation is introduced into the molecule by the selection of a $\alpha,\beta$-ethylenically unsaturated acid, optionally in combination with a saturated acid or anhydride.

Thus suitable acids are, for example, unsaturated aliphatic acids, e.g. maleic, fumaric and itaconic acids; saturated aliphatic acids, e.g. malonic, succinic, glutaric, adipic, pimelic, and azelaic.

Suitable dihydric alcohols are chosen from, for example, ethylene glycol, poly(ethylene glycols) e.g. diethylene glycol, hexane 1,6-diol, propylene glycol, dicyclohexanol and neopentyl glycol. Alternatively, the alcohol may be one which initially contained three or more hydroxyl groups, the groups in excess of two optionally being at least in part etherified with, for example, a monohydric alcohol e.g. methanol, ethanol and n-butanol or esterified with monobasic acide, e.g. benzoic acid, p-tertiary-butyl benzoic acid and chain like aliphatic acids of up to 18 carbon atom chain length e.g. coconut oil monoglyceride.

The methods by which unsaturated polyesters of this type are formulated and made are well known in the art. The resins prefered for this invention are formulated with a glycol excess. The glycol excess determines the final viscosity.

It is preferred in the working of the present invention that the acid value of the polyester lie within certain limits. We have found it preferable to select polyesters whose acid values lie in the range 5–50 mg KOH/g, preferably 10–25 mg KOH/g and most preferably 15–20 mg KOH/g. Acid values greater than 23 may result in low opacity beads when used in coatings. If the acid values are much less than 15, instability may occur during the curing state. This results in the formation of bead aggregates and in the extreme case, complete aggregation of the batch can occur.

The unsaturated monomer in which the unsaturated polyester resin is dissolved and cross-linked must be essentially water-insoluble. Monomers which have solubility at 20° C. of less than 5% (w/w) in water are considered to be suitably water-insoluble for the present purpose. A single monomer or a mixture of monomers may be used and in general the monomer will contain only a single polymerizable double bond. However, it is known that polyfunctional monomers, that is, monomers containing more than one polymerizable double bond, may also be used to cross-link unsaturated polyester resins. Such polyfunctional monomers are, however, normally present only as a minor constituent of a mixture of monomers, the major proportion of which is monofunctional monomer. Hence mixtures comprising e.g. divinyl benzene may be used in the performance of the present invention.

The preferred ethylenically unsaturated monomers are selected from styrene, the mixed isomers of methyl styrene commerically available as 'vinyl toluene' and methyl methacrlate, because of the ease with which they can be copolymerised with the unsaturated resin. For best results, it is preferred that the monomer comprises at least 50% by weight of styrene.

The choice of monomers is not, however, restricted to the above monomers alone. Bearing in mind the requirements that the total monomer must be essentially insoluble in water and also be a solvent for the unsaturated polyester resin, there may be present in a minor proportion other polymerizable unsaturated monomers to, for example, modify the physical properties of the coreacted resins. Typical co-monomers are, for example, ethyl acrylate, n-butyl methacrylate, and acrylonitrile.

The alkyl acryloyl derivative which is dispersed within the unsaturated polyester resin and unsaturated monomer must be essentially water soluble, or can be made water soluble through the formation of a quaternized structure or by other methods known in the art. A single acryloyl derivative or a mixture of acryloyl derivatives may be used and in general the acryloyl root structure will contain only a single polymerizable double bond. In some cases the acryloyl root structure may contain two or more polymerizable double bonds.

Typical examples include MAPTAC (methacrylamidopropyltrimethylammonium chloride), TMAEMC (2-trimethylammoniumethylmethtacrylic chloride), DANA (3-dimethylaminoneopentylacrylate) and BAEMA (2-t-butylaminoethylmethacrylate)

MAPTAC

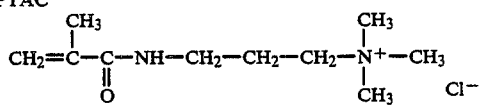

TMAEMC

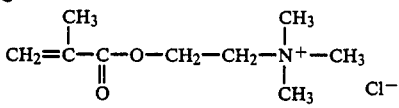

DANA

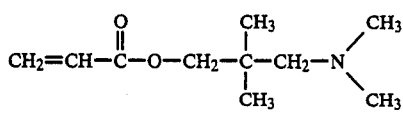

BAEMA

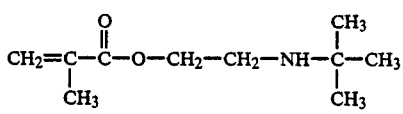

In general, we have found that the upper limit of usefulness of such acryloyl derivatives is up to 30 weight percent of tthe ethylenically unsaturated polyester, preferably 20 weight percent, and more preferably 15 weight percent based on the non-volatile portion of both the polyester resin and the acryloyl derivatives. Higher concentrations of the acryloyl derivative quaternized structure, for example, may give a detabilising effect to the emulsion.

Optionally a few percent by weight of a non-polymerizing organic liquid, e.g. n-butanol or toluene, may be mixed with the monomer to increase the solubility of the polyester resin therein or may be introduced as an incidental part of the process, e.g. in preparing the polyester.

It is highly preferred that there be included in the dispersions used in this invention a surfactant chosen from those which are well known in the art. Typical examples of suitable species are the sulphates of nonylphenol and dodecylphenol ethoxylates wherein the alkylenen oxide chain comprises at least 5 ethylene oxide units. The surfactant is typically present to the extent from 0.75–7.5% (preferably 3.0–4.5%) by weight of dispersant solids per volume of total granule solids and may be added initially to any of the phases of the dispersion prior to polymerization.

The base used in this invention may be selected from the polyamine bases of the variety described by Gunning in U.S. Pat. Nos. 3,879,314 and 3,923,704 or the metaloxide, hydroxide and salt bases described by Beresford in U.S. Pat. No. 4,321,322. We have found the preferred base is magnesium oxide. When an amine base is used, sufficient amine should be present such that there are present from 0.3–4.0, preferably 1.3–3.2 amine groups per polyester carboxyl group. When a metal oxide, hydroxide or salt base is used, sufficient base should be present such that there is present from 0.8–1.8 equivalents of metal cation per equivalentnof polyester carboxyl group.

Particulate solids, as hereinbefore described, may be optionally included in the dispersions according to the present invention.

The particulate fillers may be dispersed in the polyester solution prior to the emulsification of water therein, or into the water to be emulsified therein or into both, the incorporation into the water being an especially convenient method. The incorporation of the filler or fillers may be carried out using methods and dispersing agents known to the art. A further method of imparting pigmentation is the addition of base in excess of the quantity needed for complete neutralization of the carboxyl groups of the polyester resin. All of the bases preferred in the present invention are capable of acting as extender pigments and some of them, for example, zinc oxide, are primary opacifying pigments in their own right. Thus, the addition of a quantity of base in excess of that required for complete neutralization of the carboxyl groups for the purpose of pigmentation is encompassed by the present invention.

Unusual effects may be produced in a material comprising granules in which the filler is at least in part coloured. For example, the filler may comprise iron oxide, phthalocyanine, quinacridone or the like. Chemical or physical tagging agents may be included in the vesicles or in the dispersion stage, included are dyes, ultra-violet absorbers, quenchers, or brighteners, fluorescent materials and like additives.

Preferably, the particulate solids concentration is no more than 60% by volume of the vesicle. While the size of the chosen particles depends on the actual vesicle diameter, it is prefered that the maximum particle diameter should be 10 microns.

The preferred method of preparation of granules is the "double emulsion" method referred to hereinabove. The initial stage in the preparation of the novel polymeric vesiculated granules is the emulsificattion of water into the solution in ethylenically unsaturated monomer or carboxylated unsaturated polyester resin (the solution in ethylenically unsaturated monomer of carboxylated unsaturated polyester resin shall hereinafter be referred to as "the polyester solution" and the emulsion of water in the polyester solution shall hereinafter be referred to as the "first emulsion"). The aklyl acryloyl derivative may be added to the polyester solution or to the water in the first phase with mechanical agitation. The amount of the alkyl acryloyl derivative added to the polyester resin solution is a portion of the total amount desired such that when the remaining portion is added to the second emulsion stage the stable double emulsion of system is maintained. Preferably, the alkyl acryloyl derivative should be added in the ratio of from 0 : 100 to 55 : 45, first emulsion : second emulsion on a weight basis. The mechanical agitation is continued until the viscosity of the emulsion is essentially constant.

The agitation is carried out in the presence of the base which may be present in the polyester solution, the water or both. If pigmented granules are required, the pigment may be added at this stage, or it may be added to the water, the polyester solution or both prior to the formation of the first emulsion.

The first emulsion is dispersed in water which contains the second portion of the alkyl acryloyl derivative and a stabilizer for the dispersed first emulsion particles and stirred until the desired granule size is achieved; this is the "double emulsion". The stabilizer may be chosen from the wide range of materials known to be suitable for this purpose but we have found that an especially suitable material is a water-soluble partially hydrolysed poly(vinyl alcohol) with a degree of hydrolysis of 86 to 89% and a viscosity of 44–50 centipoise (30° C. 4% wt. solution, BL type viscometer). A concentration of stabiliser of the order of 0.1–2.0 % by weight of the total water (vesicular water and continuous phase water) gives satisfactory results.

The surfactant may be added to any stage of the process prior to polymerization and to any phase of the double emulsion.

Polymerization of the polyester resin is effected by free radical means. This can be achieved by the use of a free radical initiator such as an organic peroxide or by exposure to a radiation source such as ultra-violet radiation or a radioactive element. When a free radical initiator is used it may be conveniently dissolved ithe polyester resin solution before the dispersion of the solution in water or it may be added to the continuous water phase following the formation of the double emulsion.

The preferred initiation system is a redox system of diethylene triamine and cumene hydroperrroxide triggered by ferrous ions derived from ferrous sulphate. These three materials are added in the followig sequential order to the continuous phase: ferrous sulphate, diethylene triamine, and cumene hydroperoxide.

With the incorporation of the alkyl acryloyl derivatives in the first and second emulsion stages the vesiculated polyester granules thus formed have excellent colloidal stability and anti-settling properties. The shelf storage life of other emulsion is extended beyond that reasonably expected for granules prepared without the acryloyl derivatives. The aqueous slurry of vesiculated polyester granules thus formed may be used directly in an aqueous paint formulation, or in paper coatings, or paper wet-end applications. The aqueous slurry of vesicuated polyester granules may be dewatered, by any convenient means, for example by the method described in U.S. Pat. No. 4,154,923 and subsequently redispersed in an aqueous or non-aqueous medium, or incorporated into a paste, for example, for use as a filler or a putty, or in a polymer fillm.

The paper compositions prepared using granules as hereinbefore defined have consistently improved first-pass retention.

The papermaking process can be carried ou using a conventional furnish formed in part or totally from hardwood, softwood and recycled pulps and/or broke if desired incorporating an internal sizing agent, for example, natural and fortified rosins or an aqueous detene dimer emulsion.

The aqueous compositions of use in accordance with this invention can be employed in alkaline papermaking system, that is systems in which the paper furnish is maintained at a neutral or alkaline pH value, or in an acid papermaking system, that is systems in which the paper furnish is maintained at an acid pH value.

In yet a further feature the invention provides paper containing dispersed therein vesiculated polymer granules as hereinbefore defined.

The invention is further described with reference by way of example only to the following examples in which all parts are expresed by weight.

EXAMPLE 1

This example illustrates the preparation of 10 micron pigmented vesiculated polyester resin granules in which the alkyl acryloyl derivative is in the first and second emulsion stages. In this example the alkyl acryloyl derivative was MAPTAC.

| GROUP | MATERIAL | | PARTS (W/W) |
|---|---|---|---|
| A | water | | 3.089 |
|   | dispersant | (1) | 0.237 |
|   | antifoam | (2) | 0.014 |
| B | titanium dioxide pigment | (3) | 9.250 |
| C | MAPTAC | (4) | 0.237 |
| D | water | | 4.267 |
| E | water | | 1.292 |
| F | polyester | (5) | 7.592 |
|   | styrene | (6) | 4.211 |
|   | magnesium oxide | (7) | 0.042 |
| G | hydroxyethyl cellulose | (8) | 7.538 |
|   | poly(vinyl alcohol) | (9) | 4.377 |
|   | MAPTAC | | 0.984 |
|   | water | | 28.628 |
| H | water | | 25.701 |
| I | ferrous sulphate | (10) | 0.003 |
|   | diethylene triamine | (11) | 0.041 |
| J | cumene hydroperoxide | (12) | 0.080 |
| K | bactericide | (13) | 0.073 |
|   | ammonia solution | (14) | 0.165 |
|   | water | | 2.179 |
|   |   |   | 100.000 |

(1) Dispersant: a 60% wt. solids ammonium nonylphenoxypolyethoxy sulphate in ethanol. Fenopon* CO-436 (ex. GAF Corp)
(2) Antifoam: mineral oil and surfactant blend. Proprietary Foamaster* NS1 (ex. Diamond Shamrock)
(3) Titanium dioxide pigment: rutile grade with organic surface treatment on an alumina based inorganic coating. Tioxide* RHD6-X (ex. Tioxide)
(4) MAPTAC: a 50% weight solids solution in water Mhoromer* BM-613 (ex. Rohm Tech.)
(5) Polyester: a 65% wt. solids solution of a 4.216/2.566/1.000 (molar) propylene glycol/maleic anhydride/phthalic anhydride solution in styrene
(6) Styrene: commercially available material (ex. Dow Chemical)
(7) Magnesium oxide: commercially available light grade (ex. BDH Chemicals)
(8) Hydroxyethyl cellulose: a 1.5% wt. solids aqueous solution of hydroxyethyl cellulose. Natrosol* 250 HR (ex. Hercules) specification: (i) viscosity = 1500–2500 cp. Brookfield at 25° C. using 1% wt. solution (ii) molar substitution for ethyl = 2.5
(9) Poly(vinyl alcohol): a commercially available 7.5% wt. solids aqueous solution of poly(vinyl alcohol) BP-24 (ex. Chang Chun Petrochemical Co. Ltd., Taipei, Taiwan) specification: (i) degree of hydrolysis = 86–89% (ii) viscosity = 40–50 centipoise BL type viscometer at 30° C. using a 4% wt. solution
(10) Ferrous sulphate: commercially available material (ex. J. T. Baker Chemical Co.) specification: hepta hydrate
(11) Diethylene triamine: commercially available material (ex. Union Carbide)
(12) Cumene hydroperoxide: a commercially available 78% active material (ex. Pennwalt)
(13) Bactericide: a commercially available 20% wt. active aqueous dipropylene glycol solution of 1,2-benzisothiazolin-3-one. Proxel* GXL (ex. Imperial Chemical Industries PLC)
(14) Ammonia: a commercially available 30% wt. solution ammonium hydroxide in water. (ex. Stanchem)
*trade mark The pigmented vesiculated polyester resin granules were made as follows:

Materials "A" were mixed and pigment "B" added to "A" at a uniform rate while stirring. Stirring was increased to a high speed and continued until the pigment was completely dispersed. Material "C" was added while stirring, the water "D" was added to give a millbase.

Materials "F" were mixed until the magnesium oxide was completely dispersed. The millbase was washed into "F" using water "E". This was mixed with high speed stirring until the dispersed particles of the millbase were at least one micron in diameter. This is referred to as the "first emulsion".

Materials "G" were blended together and the temperature adjusted such that when the first emulsion was added to materials "G" the resulting temperature was 25° C. The attention to the final temperature was found to be critical. The first emulsion was added to the temperature adjusted materials "G". The stirring was maintained at high speed until the droplets of the first emulsion were essentially ten microns or less in diameter. This is referred to as the "second emulsion".

The speed of the mixer was dropped to a slow stir. The "H" stage water temperature was adjusted such that the resulting temperature, when added to the double emulsion, would attain 35° C. The "H" stage water was added to the double emulsion.

Materials "I" were added to the second emulsion. The ferrous sulphate was first dissolved into a small amount of hot water before addition.

Material "J" was added, then the mixer was turned off. This was left undisturbed for a minimum of three hours to effect curing.

Materials "K" were added after curing using moderate stirring speed.

EXAMPLE 2

This example illustrates the preparation of 10 micron pigmented vesiculated polyester resin granules in which the alkyl acryloyl derivative is in the second emulsion stage only. For the purposes of this example the alkyl acryloyl derivative was chosen to be TMAEMC. The materials were as described in Example 1 except as noted.

| GROUP | MATERIAL | | PARTS (W/W) |
|---|---|---|---|
| A | water | | 3.089 |
|   | dispersant | | 0.237 |
|   | antifoam | | 0.014 |
| B | titanium dioxide pigment | | 9.250 |
| C | water | | 4.267 |
| D | water | | 1.292 |
| E | polyester | | 7.592 |
|   | styrene | | 4.211 |
|   | magnesium oxide | | 0.042 |
| F | hydroxyethyl cellulose | | 7.538 |
|   | poly(vinyl alcohol) | | 4.377 |
|   | TMAEMC | (15) | 0.763 |
|   | water | | 28.628 |
| G | water | | 26.159 |
| H | ferrous sulphate | | 0.003 |
|   | diethylene triamine | | 0.041 |
| I | cumene hydroperoxide | | 0.080 |
| J | bactericide | | 0.073 |
|   | ammonia solution | | 0.165 |
|   | water | | 2.179 |
|   |   | | 100.000 |

(15) TMAEMC: an 80% wt. solids solution in water Mhoromer* BM-604 (ex. Rohm Tech.)
*Trade Mark The pigmented vesiculated polyester granules were made as follows:

Materials "A" were mixed and pigment "B" added to "A" at a uniform rate while stirring. Stirring was increased to a high speed and continued until the pigment was completely dispersed. The water "C" was added to give a millbase.

Materials "E" were mixed until the magnesium oxide was completely dispersed. The millbase was washed into "E" using water "D". This was mixed with high speed stirring until the dispersed particles of the millbase were at least one micron in diameter. This is referred to as the "first emulsion".

Materials "F" were blended together and the temperature adjusted such that when the first emulsion was added to materials "F" the resulting temperature was 25° C. The attention to the final temperature was found to be critical. The first emulsion was added to the temperature adjusted materials "F". The stirring was maintained at high speed until the droplets of the first emulsion were essentially ten microns or less in diameter. This is referred to as the "second emulsion".

The speed of the mixer was dropped to a slow stir. The "G" stage water temperature was adjusted such that the resulting tempeature, when added to the double emulsion, would attain 35° C. The "G" stage water was added to the double emulsion.

Materials "H" were added to the second emulsion. The ferrous sulphate was first dissolved into a small amount of hot water before addition.

Material "I" was added, then the mixer was turned off, and the emulsion was left undisturbed for a miximum of three hours to effect curing.

Materials "J" were added after curing using moderate stirring.

Table A outlines some of the physical parameters obtained when pigmented vesiculated granules are prepared in accordance with the aforementioned methods of preparation for 10 micron diameter granules.

TABLE A

|  | 10 micron Granules |
|---|---|
| density of dried granules | 0.59 g/ml |
| percent vesiculation[1] | 65% |
| weight solids | 21.5% |
| volume solids | 36% |
| maximum granule size[2] | 12 microns |
| median granule size | 5.2 microns |
| minimum granule size | 3 microns |
| vesicle size[3] | 0.5–3.0 microns |
| surface pores on granules | <0.2 micron |
| thickness of granule wall | 0.1–0.5 micron |

Note:
[1] vesiculation determined by mercury porisimetry
[2] granule size determined by Laser Diffraction Granulometer
[3] internal diameters measured using scanning electron microscopy

EXAMPLE 3

This example illustrates the preparation of 10 micron pigmented vesiculated polyester resin granules in which the alkyl acryloyl derivative is in the first and second emulsion stages. For the purposes of this example the alkyl acrylol derivative was chosen to be MAPTAC. The formulation has been selected as an example for use in paper applications.

| GROUP | MATERIAL | PARTS (W/W) |
|---|---|---|
| A | water | 3.163 |
|   | dispersant | 0.243 |
|   | antifoam | 0.014 |
| B | titanium dioxide pigment | 9.472 |
| C | MAPTAC | 0.243 |
| D | water | 4.369 |
| E | water | 1.323 |
| F | polyester | 7.774 |
|   | styrene | 4.312 |
|   | magnesium oxide | 0.043 |
| G | hydroxyethyl cellulose | 7.719 |
|   | poly(vinyl alcohol) | 4.482 |
|   | MAPTAC | 1.008 |
|   | water | 29.315 |
| H | water | 26.318 |
| I | ferrous sulphate | 0.003 |
|   | diethylene triamine | 0.042 |
| J | cumene hydroperoxide | 0.082 |
| K | bactericide | 0.075 |

| GROUP | MATERIAL | PARTS (W/W) |
|---|---|---|
| | | 100.000 |

The materials used and method of preparation follows that for Example 1.

The following series of experiments employ the following terms:

Freeness of pulp is a measure of the drainage rate of water through the pulp and is measured in accordance with the TAPPI (Technical Association of the Pulp and Paper Industry) Standard T227 om-75 and is also referred to as Canadian Standard Freeness.

Opacity of the paper sheet is expressed as a light scattering co-efficient (L.S.C.) and measured in accordance with TAPPI Standard T425 om-81 using light with a wavelength of 572 nanometers.

The term handsheet is used to refer to a paper sheet made in accordance with and employing the equipment described in the TAPPI standard T205 om-81. Conditioning refers to the conditioning atmospheres of 23.0° C. plus or minus 1° C., and 50.0 ±2.0 percent relative humidity that the paper sheets are exposed to in accordance with TAPPI standard T405 om-83.

Handsheets were prepared by the following general procedure.

The furnish or solids in the pulp slurry comprised 100 percent by weight of a fully bleached chemical hardwood/softwood blend. The pulp was a comercially produced kraft pulp, and was subsequently beaten to a Canadian Standard Freeness of 415 mls. After beating, individual samples of pulp were disintegrated, stirred, and varied amounts of the pigmented vesiculated granules added.

The furnish was subsequently passed through a sheetmaker and the resultant handsheet pressed and conditioned.

EXAMPLE 4

The hereinabove general procedure for the preparation of furnishes was carried out to prepare furnish comprising a fully bleached chemical hardwood/softwood blend kraft pulp and a filler comprising pigmented vesiculated polymeric granules (PVG) as described in this invention, or comprising standard manufacture vesiculated polymeric granules (SPVG). The filler composition was an emulsion form of the pigmented vesiculated granules as described in Example 1 for the MAPTAC—PVG granules, or Example 2 for the TMAEMC—{VG granules.

The results are shown in Table B.

TABLE B
EXAMPLE 4

| RUN | SAMPLE | % ADDED* | % RETAINED OF ADDED | L.S.C. |
|---|---|---|---|---|
| 1. | Pulp + MAPTAC — PVG | 22.0 | 35.1 | 648 |
| 2. | Pulp + MAPTAC — PVG | 27.5 | 37.5 | 681 |
| 3. | Pulp + MAPTAC — PVG | 33.0 | 30.1 | 686 |
| 4. | Pulp + MAPTAC — PVG | 38.5 | 34.0 | 751 |
| 5. | Pulp + MAPTAC — PVG | 44.0 | 31.5 | 774 |
| 6. | Pulp + TMAEMC — PVG | 3.6 | 73.3 | 589 |
| 7. | Pulp + TMAEMC — PVG | 6.0 | 84.8 | 630 |
| 8. | Pulp + SPVG | 32.3 | 3.0 | 497 |
| 9. | Pulp only | — | — | 434 |

*weight solids of granules on weight solids of pulp

Example 4, Table B shows that the pigmented vesiculated polyester resin granules in which the alkyl acryloyl derivative is MAPTAC demonstrates greatly improved retention and higher opacity than the standard manufacture pigmented vesiculated polyester resin granules. If the run number 3 and run number 8 are compared, it can be seen that the granule comprising tte MAPTAC has been retained at a level of 30.1% whereas the standard granule has been retained at only 3.0%. This improved retention is reflected in higher opacities. Run number 3, the granule comprising MAPTAC, has an opacity of 686; whereas run number 8, the standard manufacture granule, has an opacity of 497.

Example 4, Table B also shows that the pigmented vesiculated polyester resin granules in which the alkyl acryloyl derivative is TMAEMC demonstrates greatly improved retention and higher opacity than the standard manufacture pigmented vesiculated polyester resin granules. Run number 6 uses a granule comprising TMAEMC added at a level of 3.6% on pulp (weight solids on weight solids). The opacity obtained for this run is 589. This can be compared to run 8 which uses standard manufacture granules at an addition level of 32.2%, the opacity obtained is 497. These two runs clearly show that a higher opacity was obtained, using less weight of granules added, by the use of granules comprising TMAEMC.

We claim:

1. Vesiculated granules of cross-linked carboxylated polyester resin prepared by the free radical polymerication of a dispersion comprising an ethylenically unsaturated monomer; a carboxylated unsaturated polyester resin having an acid value of from 5–50 mg KOH/g; water; and a base; characterized in that said dispersion further comprises an alkyl acryloyl derivative of the formula:

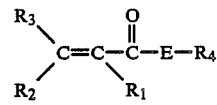

where $R_1$, $R_2$ and $R_3$ are selected from H and $CH_3$; E is NH or O; $R_4$ is $C_{1-6}$ alkyl substituted with Z; wherein Z is $NR_5R_6$; wherein $R_5$ is $C_{1-4}$ alkyl and $R_6$ is H; or $R_5$ and $R_6$ are indepepndently $C_{1-3}$ alkyl; and quaternary $C_{1-3}$ alkyl salts of said alkyl acryloyl derivative.

2. Vesiculated granules according to claim 1 wherein said alkyl acryloyl derivative is a compound of the general formula:

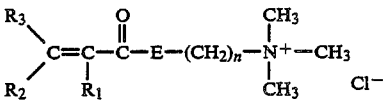

wherein $R_1$, $R_2$, and $R_3$ are selected from H and $CH_3$; E is NH or O; and n is 1–3.

3. Vesiculatd granules according to claim 1 wherein said granules contain up to 65% by weight, expressed as a solid on the solid portion of the granule, of a particulate material.

4. Vesiculated granules according to claim 3 wherein said particulate material is a pigment.

5. An aqueous composition comprising vesiculated granules as claimed in any one of claims 1–4.

* * * * *